United States Patent [19]

Imbert

[11] 4,424,786

[45] Jan. 10, 1984

[54] FUEL SAVING DEVICE

[76] Inventor: Jean C. Imbert, Orelys, Fox Amphoux, France, 83126

[21] Appl. No.: 311,929

[22] Filed: Oct. 16, 1981

[30] Foreign Application Priority Data

Oct. 20, 1980 [FR] France ................................ 80 22411

[51] Int. Cl.³ ...................... F02M 27/04; B01D 35/06

[52] U.S. Cl. .................................... 123/538; 123/536; 210/222

[58] Field of Search ............... 123/536, 537, 538, 590; 210/222, 223; 29/510, 516, 517

[56] References Cited

U.S. PATENT DOCUMENTS

| | | | |
|---|---|---|---|
| 3,976,726 | 8/1976 | Johnson | 123/536 |
| 4,005,683 | 2/1977 | Whitt | 123/536 |
| 4,153,559 | 5/1979 | Sanderson | 210/222 |
| 4,188,296 | 2/1980 | Fujita | 210/222 |
| 4,299,700 | 11/1981 | Sanderson | 210/222 |
| 4,308,847 | 1/1982 | Ruizzo, Jr. | 123/536 |
| 4,357,237 | 11/1982 | Sanderson | 210/222 |
| 4,366,053 | 12/1982 | Lindler | 210/222 |
| 4,372,852 | 2/1983 | Kovacs | 210/222 |

*Primary Examiner*—Raymond A. Nelli

*Attorney, Agent, or Firm*—Scrivener, Clarke, Scrivener and Johnson

[57] ABSTRACT

The present invention relates to a fuel saving device adaptable to all types of carburetors, petrol engines and domestic or industrial burners, constituted by a solenoid generating a magnetic field which has an influence on the air-fuel mixture.

Said solenoid has a red copper coil, has its axis oriented in parallel to the axis of the engine, and, periodically, in a first pre-determined direction, during the moon phase which goes from the full moon to the new moon, and in a second, opposite, direction, during the moon phase going from the new moon to the full moon.

The invention finds an application in motor engine of low consumption.

3 Claims, 1 Drawing Figure

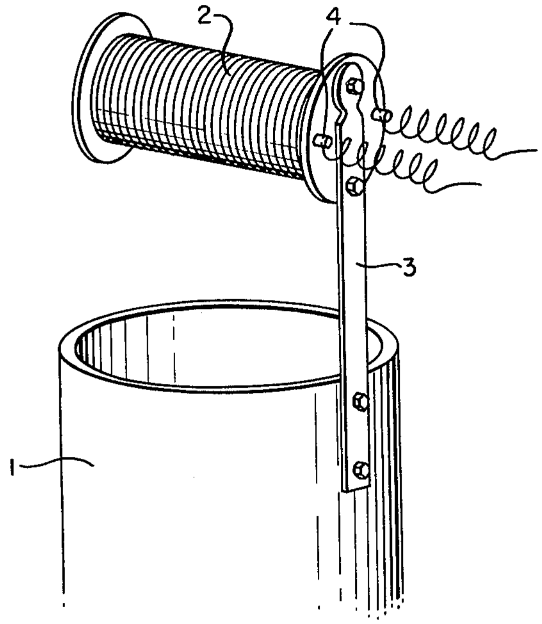
2
4
3
1

FUEL SAVING DEVICE

The invention relates to a fuel saving device for use for example in a motorcar carburetor or any type of fuel-burning apparatus.

Devices are already known which, without actually being saving devices, comprise a solenoid, generator of a magnetic field, which is essentially meant to homogenize the mixture of fuel and air.

According to the invention, which effectively constitutes a saving device, the following dispositions are adopted wherein the solenoid has a red copper coil and its axis is oriented in parallel to the axis of the engine, and periodically, in a first pre-determined direction during the moon phase which goes from the full moon to the new moon (last phase), and in a second opposite, direction, during the following moon phase, going from the new moon to the full moon, (first phase) and so forth.

In preferred manner, the first direction is determined by the experimental comparison carried out at a given time during one of the said moon phases, of the fuel consumptions obtained by orienting the solenoid in one direction and in the other, and by the choice resulting from the direction to which corresponds the lowest fuel consumption.

The invention will be more readily understood on reading the following description, with reference to the accompanying drawing which diagrammatically illustrates a disposition according to the invention.

The description is relative to a special application of the invention to equip a motorcar carburetor.

The device in this application is very simple, and is constituted by a solenoid directly plugged into the battery of a motorcar (6 V or 12 V). The solenoid is fitted on the carburetor by way of a metal bracket, which can transmit to the carburetor the magnetic properties of the solenoid. A constant magnetic field is thus created around and inside the carburetor. Said solenoid is designed so as to be able to operate continuously without heating, whilst the motor is running, a suitable transistor and resistor being inserted into its circuit. As the purpose of the solenoid is to create a magnetic field it may, or may not, have a ferromagnetic core.

The result is a sequencing of the molecules of the air-fuel mixture, added to an over-activation of said mixture by the lines of force of the solenoid. Said latter, during the test, must be constituted by a red copper coil. The combination of these effects enables to save, according to the tests conducted up to now, between 40 and 50% of fuel, without adding any other components than those indicated hereinabove.

In the tests conducted, the axis of the solenoid was placed in parallel to the axis of the engine (a petrol engine with four cylinders in alignment), i.e. orthogonally to the vertical direction of flow of the air-fuel mixture.

The orientation of the axis of this solenoid from the rear towards the front of the engine, or the reverse, is a capital point which is the result of the following observation:

There is a relation between the operation of the device and the lunar cycle: this is not a scientific observation of the phenomenon, but a simple experimental verification. Indeed, the magnetic field should be reversed (by reversing the solenoid or the terminals connecting it to the battery), every fifteen days, on every new or full moon, with respect to its previous good-operating position. If this is not done, the engine will consume, now half, now twice its normal consumption. This system therefore works without any outside intervention provided of course that care has been taken to connect the terminals of the solenoid to the battery via the ignition circuit of the engine, and in particular the ignition key.

Thus the choice of the orientation of the axis of the solenoid can just simply result, at a given moment corresponding to one of the two aforesaid moon phases, from the verification of the consumptions obtained by placing the solenoid in one direction and then in the reverse direction. The direction to be noted is obviously the one in which the lowest consumption is measured.

The solenoid can be incorporated to the air filter, with which all modern cars are equipped. It suffices to provide thereon a hand lever which engages the solenoid (and can be connected to the dashboard) and which, by simply being turned over, causes the latter to make a half-turn (every two weeks after consulting a calendar indicating the lunar cycles).

The device according to the invention can be used on all types of cars provided with an internal combustion engine which is in turn equipped with a carburetor.

It can also be found interesting applications in aircraft engines, permitting with the fuel economy to enlarge its range.

It can also be used in industry, and be adapted to all types of burners.

Legend of the drawing

1: Carburetor chamber,
2: Solenoid,
3: bracket to secure the solenoid on the chamber 1,
4: connection terminal, to connect the solenoid to the electric ignition circuit of the engine.

What is claimed is:

1. The method of treating the fuel supplied to an internal combustion engine having a carburetor, comprising the steps of:

(a) positioning in the air-fuel supply stream to the carburetor a solenoid having a red copper coil, with its axis at right angles to the direction of movement of the air-fuel stream to the carburetor, and energizing the coil to produce a magnetic field surrounding the carburetor, (b) positioning the coil to cause minimum fuel consumption, (c) reversing the polarity of the coil at the next change of the full-to-low and low-to-full lunar phase, and (d) continuing the reversal of polarity with successive changes in the said lunar phases.

2. The method of operating an internal combustion engine according to claim 1, in which the polarity of the coil is reversed by reversing the coil end-for-end.

3. The method of operating an internal combustion engine according to claim 1, in which the polarity of the coil is reversed by reversing the electrical connections which energize the coil.

* * * * *

REEXAMINATION CERTIFICATE (380th)

United States Patent [19]

[11] B1 4,424,786

Imbert

[45] Certificate Issued Sep. 3, 1985

[54] FUEL SAVING DEVICE

[76] Inventor: Jean C. Imbert, Orelys, Fox Amphoux, France, 83126

Reexamination Request:
No. 90/000,619, Sep. 19, 1984

Reexamination Certificate for:

| | |
|---|---|
| Patent No.: | **4,424,786** |
| Issued: | **Jan. 10, 1984** |
| Appl. No.: | **311,929** |
| Filed: | **Oct. 16, 1981** |

[30] Foreign Application Priority Data

Oct. 20, 1980 [FR] France ................................ 80 22411

[51] Int. Cl.[3] ........................ F02M 27/04; B01D 35/06

[52] U.S. Cl. ...................................... 123/538; 123/536; 210/222

[58] Field of Search ................ 123/536, 537, 538, 539

[56] References Cited

U.S. PATENT DOCUMENTS

| | | | |
|---|---|---|---|
| 3,830,621 | 8/1974 | Miller | 210/222 |
| 3,976,726 | 8/1976 | Johnson | 261/1 |
| 4,259,281 | 3/1981 | Lanfranconi et al. | 174/110 PM |
| 4,308,847 | 1/1982 | Ruizzo | 123/573 |

*Primary Examiner*—T. M. Argenbright

[57] ABSTRACT

The present invention relates to a fuel saving device adaptable to all types of carburetors, petrol engines and domestic or industrial burners, constituted by a solenoid generating a magnetic field which has an influence on the air-fuel mixture.

Said solenoid has a red copper coil, has its axis oriented in parallel to the axis of the engine, and, periodically, in a first pre-determined direction, during the moon phase which goes from the full moon to the new moon, and in a second, opposite, direction, during the moon phase going from the new moon to the full moon.

The invention finds an application in motor engine of low consumption.

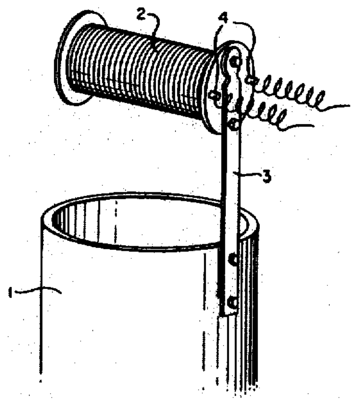

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the atent, but has been deleted and is no longer a part of the patent; matter printed in italics indicates additions made to the patent.

AS A RESULT OF REEXAMINATION, IT HAS BEEN DETERMINED THAT:

Claims 1-3 are cancelled.

* * * * *